Aug. 7, 1928.
W. T. BARKER, JR
1,679,848
GLASS PRESS
Filed Oct. 23, 1924        2 Sheets-Sheet 2
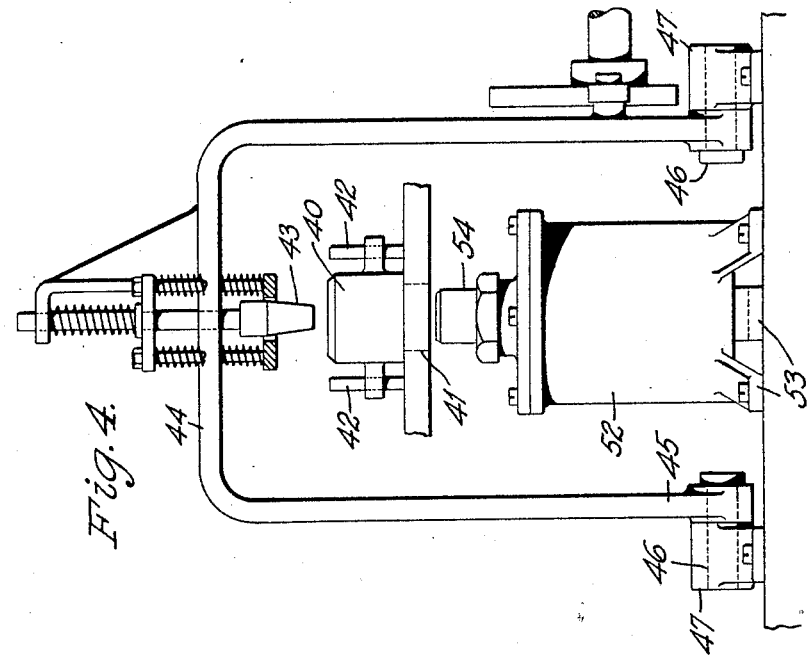
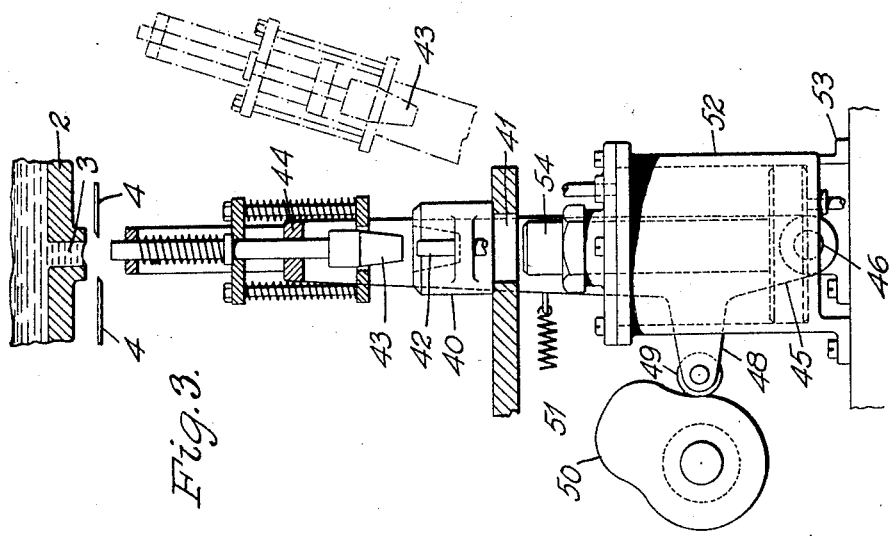
Inventor:
William T. Barker, Jr.
by Wm H Houiss
Atty.
Witness:
S. S. Grotta Patented Aug. 7, 1928.

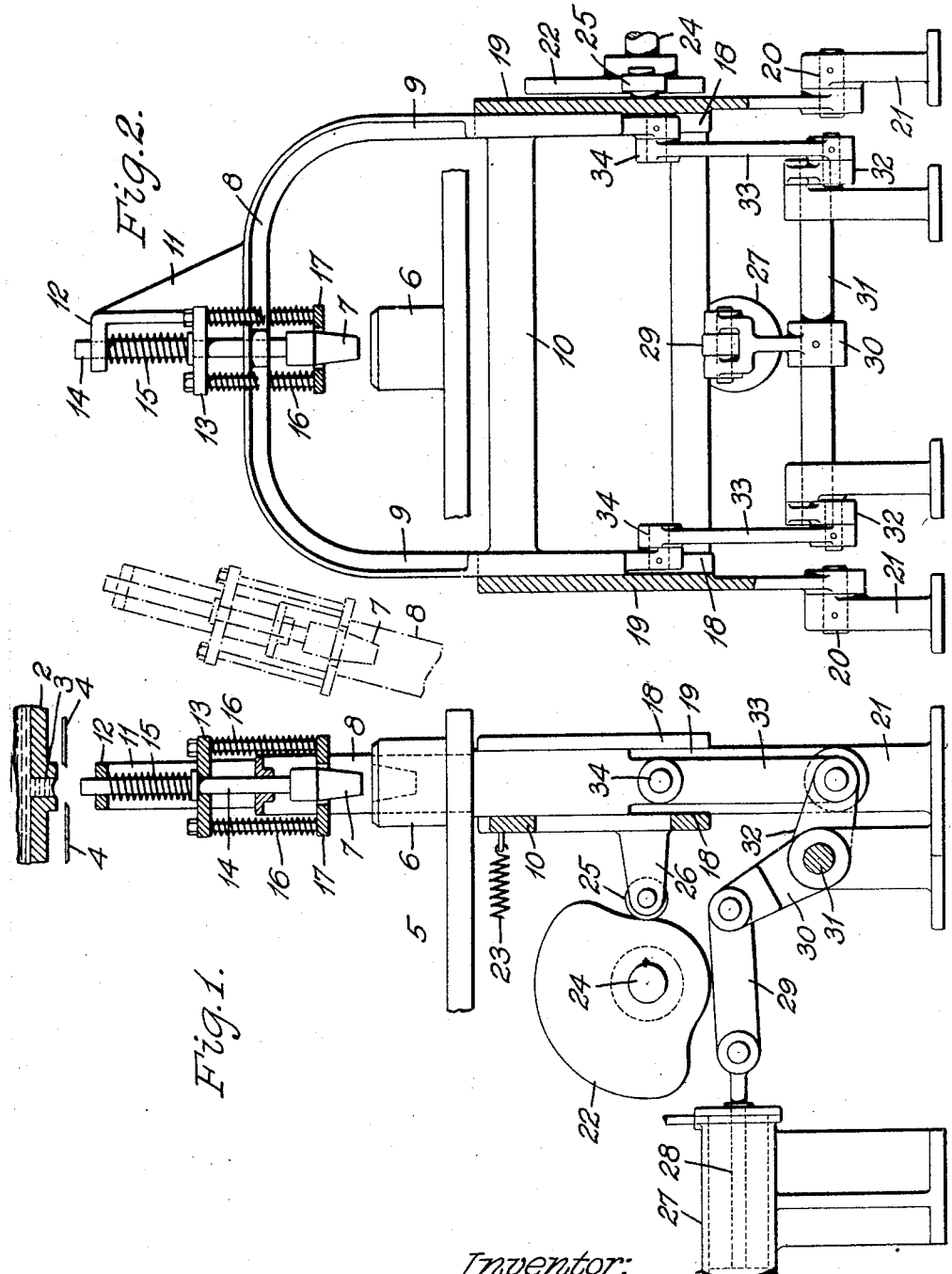

1,679,848

UNITED STATES PATENT OFFICE.

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE.

GLASS PRESS.

Application filed October 23, 1924. Serial No. 745,372.

My invention relates to the production of pressed glassware. One of its objects is to provide a method of pressing glassware in which the glass is mechanically pressed in the mold at the same station at which it receives its charge of glass. As compared with the methods heretofore employed for making pressed glassware, this method allows the glass to be pressed while in a more uniform condition and also allows the glass to be fed to the molds at a cooler temperature, and yet to be pressed as hot or hotter than is practicable with machines in which the mold is moved away from the charging position before the glass is pressed.

The present method has the further advantage that the pressing of the glass immediately after it makes contact with the mold prevents the formation of chilled wrinkles in the molten gather which later appear as defects in the finished ware.

Another object of my invention is to provide suitable apparatus of simple and rugged construction for carrying out the above-indicated method.

Pressed glassware, such as tumblers, packing jars, bowls, ink wells and the like, are now commonly made with automatic machinery in which the glass is deposited in the mold at a charging station, after which the mold is advanced from the charging station to a pressing station where a plunger enters the mold and presses the glass therein. Certain defects result from thus delaying the pressing operation after the glass is deposited in the mold. During the time that the glass is traveling with the mold from the charging station to the pressing station, the glass becomes considerably cooled, particularly by contact with the mold, and this chilling is always more or less uneven because the contact between the glass and the mold is never perfectly uniform. Also, it has been found that when a charge of glass is allowed to remain in the mold for any considerable time before being pressed, the chilled outer skin or enamel on the glass becomes exaggerated, and retains wrinkles which are not easily eliminated by subsequent pressing.

For the proper production of pressed glassware the glass should be at as nearly a uniform temperature as possible at the time when it is pressed, and this temperature should be that which is most desirable for pressing, in order to prevent defects in the ware and also to reduce the pressure necessary to cause the glass to conform to the shape of the mold and of the pressing plunger.

For the reasons mentioned above, it is desirable that the glass be delivered into the mold at as near the desired pressing temperature as is practicable, and that the glass be pressed in the mold as soon as possible after the mold is charged. I accomplish these results, according to the embodiment of my present invention selected for illustration herein, by providing a mold table which is movable in a step-by step manner to bring a series of molds into charge-receiving position directly beneath the outlet of a glass feeder, and by providing a plunger which swings periodically between a position above the mold at the charge-receiving station and a position displaced laterally from the mold. The plunger is swung in timed relation to the operation of the feeder so that the plunger is displaced from above the mold at the time when the charge drops from the feeder into the mold and is then swung back over the mold and at once enters the mold and presses the glass.

In this specific embodiment of my invention, the plunger is mounted upon a support which oscillates upon a fixed pivot located below the mold table, and means are provided for lowering and raising the plunger when the plunger support is in its upright position in alignment with the mold. In a modified construction which is also shown and described herein, the mold is raised and lowered, instead of lowering and raising the plunger.

For a further understanding of my invention, reference may now be had to the accompanying drawings, in which:

Figure 1 is a side elevational view, with parts in section, showing an arrangement of apparatus for carrying out my invention;

Fig. 2 is a front elevational view of the same apparatus with parts in section;

Fig. 3 is a side elevational view of a modified construction in which the mold is raised and lowered and the plunger is held stationary during the pressing operation; and Fig. 4 is a front elevational view, with parts in section, of the apparatus of Fig. 3.

The drawing shows conventionally a glass feeder having a glass container 2, a discharge outlet 3, and shears 4 for severing mold charges from the glass delivered through the outlet 3. This feeder is not shown in detail, since it may be of any desired type capable of periodically delivering the desired mold charges. A feeder which has been found very suitable for this purpose is shown in the applications for Letters Patent of Karl E. Peiler, Serial No. 823,694, filed March 10, 1914 and Serial No. 747,503, filed November 23, 1924.

An intermittently rotating mold table is shown conventionally at 5 and, like the feeder referred to above, may be of any approved construction, with the usual driving connections and supporting anvil. It carries a series of molds 6, only one of which is shown and the table 5 is so located as to bring the molds 6 successively into position directly below the discharge outlet 3 of the glass feeder.

Referring to Figs. 1 and 2, a plunger 7 is arranged to cooperate with the mold 6 at the combined charging and pressing station, and this plunger is mounted on a plunger carrier 8 which, as best shown in Fig. 2, consists of a yoke having parallel arms 9 connected by a transverse member 10 and carrying a bracket 11 having projections 12 and 13 through which extends a rod 14 to the lower end of which is attached the plunger 7. A plunger relief spring 15, ware stripping springs 16 and a ware stripper 17 are shown conventionally on the drawing, and may be arranged in any suitable manner according to well-known practice in machines of this type.

The arms 9 of the plunger carrier 8 are arranged to slide in guides 18 formed in the opposed members 19 of a rocking frame and the lower ends of the members 18 are pivotally mounted on pivot pins 20 which extend through bearings in suitable stationary supports 21.

For the purpose of swinging the rocking frame to move the plunger between the full-line position and the dotted-line position shown in Fig. 1, I provide a cam 22, and a spring 23. The cam 22 is mounted on a shaft 24 and engages a roller 25 that is mounted on a bracket 26 carried by one of the side members 19 of the frame. The spring 23 is also attached to the rocking frame and to any convenient stationary support, and cooperates with the cam 22 to swing the frame on the pivot pins 20. The rotation of the shaft 24 is timed with the glass feeder to rock the plunger carrier to the dotted-line position of Fig. 1 before a charge of glass is dropped into the mold 6, and to return the plunger carrier to its full-line upright position after the charge has been deposited in the mold.

The mold having been charged and the plunger carrier having been brought to its upright position, the plunger 7 is lowered into the mold by the application of compressed air to the left end of a cylinder 27, the piston rod 28 of which is connected by means of a link 29, a lever 30, a rock shaft 31, spaced levers 32 and spaced links 33 to the plunger carrier 8. The links 33 are connected pivotally at 34 to the lower ends of the arms 9 of the plunger carrier.

It will be observed that when the cylinder 27 causes the rock shaft 31 to rotate in a clockwise direction as seen in Fig. 1, the levers 32 will pull down the links 33 and the plunger carrier, and it will also be seen that, as this movement continues, the lever 32 and the links 33 exert a toggle action which increases the pressure of the plunger near the end of the pressing operation.

In the operation of the apparatus described above, each mold charge delivered by the glass feeder falls into one of the molds 6 which has previously been brought to the charging and pressing position by the intermittent movement of the table 5. The plunger is at this moment displaced from its upright position, and, therefore, does not interfere with the proper delivery of the mold charge to the mold. As soon as the glass has entered the mold, the cam 22 allows the spring 23 to return the plunger carrier to its upright position, whereupon pressure is applied to the cylinder 27 and the plunger is lowered by the connections described above and presses the glass in the mold 6. Air is then admitted to the opposite end of the cylinder 27, thereby raising the plunger carrier. The cam 22 then moves the plunger carrier to its inclined dotted-line position, the table advances to bring a fresh mold to the charge-receiving and pressing position, and the operations are repeated in regular cycles.

Figs. 3 and 4 of the drawing show a modified construction in which the plunger has only a rocking movement to and from upright position above the mold, and is held stationary during the pressing operation, the mold being lifted into and lowered out of cooperation with the plunger, while the mold is at the charging and pressing station. In these figures, the parts of the glass feeder and the mold table are indicated by the same reference numerals as in the preceding figures. The mold table of Figs. 3 and 4 may differ from that shown in Fig. 1 in that no anvil or other means need be provided for assisting the table in supporting the molding pressure, since the molds in this construction are not resting upon the table at the time when the glass is molded. The table may, therefore, be of light and simple construction. The table carries a series of molds 40, only one of which is shown, and these molds are maintained in alignment with openings 41 in the mold table, by means of suitable guide fingers 42.

The plunger 43 in this construction is mounted upon the upper horizontal portion 44 of a swinging yoke having the lower ends of its upright arms 45 mounted on pivot pins 46 carried in suitable stationary supports 47. One of the arms 45 of the yoke carries a projecting arm 48 on which is mounted a cam roller 49 cooperating with a cam 50 which is similar to the cam 22 shown in Figs. 1 and 2, and has the same function of rocking the plunger structure between the full-line position and the dotted-line position shown in Fig. 3. A spring 51 is secured to the plunger yoke and to any convenient stationary support, and acts in opposition to the cam 50 to rock the plunger yoke upon its pivot.

For the purpose of elevating the molds 40 into cooperation with the plunger 43, a pneumatic cylinder 52 is mounted on supports 53 directly beneath the position occupied by the openings 41 in the mold table when these openings are brought to the charging and pressing position. The piston rod 54 of this cylinder is suitably formed at its upper end to engage the bottom of the mold 40 and to lift the mold sufficiently to receive the plunger 43.

The apparatus shown in Figs. 3 and 4 operates in the same general manner as the apparatus of Figs. 1 and 2. After each empty mold is brought to the charging and pressing station and the plunger structure is rocked aside, a charge of glass is deposited in the mold, the plunger is rocked back to its vertical position, and air is admitted to the bottom of the cylinder 52, thereby lifting the piston rod 54 which lifts the mold to surround the plunger 43. When the pressing operation is completed, the air pressure in the cylinder 52 is relieved, permitting the piston to descend, and lowering the mold upon the mold table, whereupon the table is indexed forward to bring the next mold to the pressing and charging station, the plunger mechanism is rocked aside, and the operation is repeated.

The fluid-pressure connections for the cylinders 27 and 52, and the valves for admitting air to these cylinders, have been omitted from the drawing, as these may be arranged in a variety of ways, the only requirement being that the parts shall be operated in proper sequence to carry out the operations mentioned above.

The ware may be removed from the mold either at the pressing station or at any of the succeeding stations, by means of any suitable take-out mechanism or by hand.

My invention is not restricted to the use of glass feeders of the gob-feeding type, which deliver mold charges that are accumulated and severed while freely suspended. I may also employ glass feeders of the stream-feeding type in which the glass flows continuously through a discharge outlet and is accumulated either in the mold or with the use of an intercepting or transferring receptacle. Or the glass may be delivered to the mold by any other suitable feeding system.

The most important novel characteristic of the glass pressing system described above is that the glass is fed into the mold at the pressing station. It will be understood that this principle may be carried out by apparatus differing widely from that which I have herein specifically shown and described, and I therefore desire that no limitations be imposed upon my invention, except such as are indicated in the appended claims.

I claim as my invention:

1. In combination with a glass feeder having a feeding outlet, a glass pressing machine having a mold mounted for movement beneath said outlet and into vertical alignment therewith to receive a mold charge delivered therefrom, and a pressing plunger mounted for movement into alignment with said outlet and said mold for pressing said mold charge while said mold is in its charge-receiving position.

2. In combination with a glass feeder having a submerged feeding outlet and capable of periodically delivering mold charges of molten glass through said outlet, a glass pressing mechanism having a mold mounted for movement into axial alignment with said outlet to receive a mold charge delivered therefrom, and a pressing plunger mounted for movement into axial alignment with both said outlet and said mold for pressing said mold charge while said mold is in its charge-receiving position.

3. In combination with a glass feeder having a submerged feeding outlet and capable of periodically delivering mold charges of molten glass through said outlet, a glass pressing machine having a mold mounted for movement into axial alignment with said outlet to receive a mold charge delivered therefrom, a pressing plunger mounted for movement into axial alignment with both said outlet and said mold, and means for producing relative vertical movement between said mold and said plunger to press said charge in said mold while it is in its charge-receiving position.

4. In combination with a glass feeder having a feeding outlet and capable of periodically delivering mold charges of molten glass through said outlet, a glass pressing machine having a mold mounted for movement into vertical alignment with said outlet to receive a mold charge delivered therefrom, a plunger for pressing said charge in said mold, means for moving said plunger into and out of alignment with said outlet and said mold, and means for raising and lowering said plunger when in such position.

5. In combination with a glass feeder having a feeding outlet and capable of periodically delivering mold charges of molten glass through said outlet, a glass pressing machine having a mold mounted for movement into vertical alignment with said outlet to receive a mold charge delivered therefrom, and means for pressing glass in said mold while said mold is in its charge-receiving position, the said pressing means comprising a pressing plunger, a support for said plunger pivotally movable into and out of alignment with said outlet and said mold, and means for producing relative vertical movement between said mold and said plunger while said plunger is in alignment with said mold.

6. In combination with a glass feeder having a feeding outlet and capable of periodically delivering mold charges of molten glass through said outlet, a glass pressing machine having a mold mounted for movement into vertical alignment with said outlet to receive a mold charge delivered therefrom, and means for pressing glass in said mold while said mold is in its charge-receiving position, the said pressing means comprising a pressing plunger, a support for said plunger pivotally movable to bring said plunger into and out of alignment with its charge-receiving position of said mold, and means for lowering and raising said plunger when said plunger is in alignment with said mold.

7. In combination with a glass container having a feeding outlet and capable of periodically delivering mold charges of molten glass through said outlet, a glass pressing machine comprising a table carrying a series of molds and movable to bring said molds in succession into vertical alignment with said outlet to receive mold charges delivered therefrom, a plunger for pressing mold charges in said mold, and means for moving said plunger into and out of operative position relative to said molds while said molds are in charge-receiving position.

8. In combination with a glass feeder having a feeding outlet and capable of periodically delivering mold charges of molten glass through said outlet, a glass pressing machine comprising a table carrying a series of molds and movable to bring said molds in succession into vertical alignment with said outlet to receive mold charges delivered therefrom, means for pressing mold charges in said molds, the said pressing means comprising a plunger, means for moving said plunger into and out of alignment with said charge receiving position, and means for producing relative vertical movement between said plunger and the mold while it is at said charge-receiving position.

9. In combination with a glass feeder having a feeding outlet and capable of periodically delivering mold charges of molten glass through said outlet, a glass pressing machine comprising a table carrying a series of molds and movable to bring said molds in succession into vertical alignment with said outlet to receive mold charges delivered therefrom, and means for pressing glass in each of said molds while at the said charge-receiving position, the said pressing means comprising a plunger, means for moving said plunger into and out of alignment with said mold at the said charge-receiving position, and means for lowering and raising said plunger when said plunger is in alignment with the mold which is at said charge-receiving position.

10. In combination with a glass feeder having a feeding outlet and capable of periodically delivering mold charges of molten glass through said outlet, a glass pressing machine comprising a table carrying a series of molds and movable to bring said molds in succession into vertical alignment with said outlet to receive mold charges delivered therefrom, and means for pressing glass in each of said molds while at the said charge-receiving position, the said pressing means comprising a plunger, a support for said plunger pivotally movable to bring said plunger into and out of alignment with said molds at the said charge-receiving position, and means for producing relative movement between one of said molds and said plunger while said mold and plunger are at the said charge-receiving position.

11. In combination with a glass feeder having a feeding outlet and capable of periodically delivering mold charges of molten glass through said outlet, a glass pressing machine comprising a table carrying a series of molds and movable to bring said molds in succession into vertical alignment with said outlet to receive mold charges delivered therefrom, and means for pressing glass in each of said molds while at the said charge-receiving position, the said pressing means comprising a plunger, a support for said plunger pivotally movable to bring said plunger into and out of alignment with the said charge-receiving position, and means for lowering and raising said plunger while said plunger and one of said molds are in alignment at said charge-receiving position.

12. A glass press comprising a rotatable mold table, molds carried by said table and adapted to move with said table to and from a pressing station, a pressing plunger adapted to cooperate with said molds at said pressing station, a support for said plunger, said support being movable between a pressing position in which said plunger is upright at said pressing station, and a position displaced laterally from said molds when they are at said pressing station sufficiently to allow said molds to be charged with glass at said pressing station, means for periodically oscillating said plunger support between said stations, and means for relatively moving said plunger and each of said molds while in alignment at said pressing station.

13. A glass press comprising an intermittently rotatable mold table, a plurality of molds carried by said table and adapted to be brought by said table successively to a pressing station, a plunger adapted to cooperate with said molds at said pressing station, a support for said plunger, said support being oscillable about a horizontal axis between a pressing position in which said plunger is upright at said pressing station, and a position in which said plunger is displaced from said pressing station, means for periodically oscillating said plunger support between said positions, and means for relatively moving said plunger and the mold which is at said pressing station when said plunger and the said mold are in vertical alignment.

14. A glass press comprising an intermittently rotatable mold table, a plurality of molds carried by said table and adapted to be brought by said table successively to a pressing station, a plunger adapted to cooperate with said molds at said pressing station, a support for said plunger, said support being oscillable about a horizontal axis between a pressing position in which said plunger is upright at said pressing station and a position in which said plunger is displaced from said pressing station, means for periodically oscillating said plunger suport between said positions, and means for lowering and raising said plunger when said plunger is in vertical alignment with the mold which is at said pressing station.

15. A glass press comprising an intermittently rotatable mold table, a plurality of molds carried thereby, an oscillable frame mounted on a pivot beneath said table, a plunger carrier mounted slidably in said frame, a plunger carried by said plunger carrier, means for rocking said frame between an upright position in which said plunger is in vertical alignment with a mold on said mold table and an inclined position in which said plunger is displaced from said mold, and means for lowering and raising said plunger when said frame is upright.

16. A glass press comprising a mold table, a plurality of molds carried thereby, an oscillable frame mounted to rock upon a pivot disposed beneath said table, a plunger carrier mounted slidably in said frame, a plunger carried by said plunger carrier, cam-operated means for rocking said frame between an upright position in which said plunger is in vertical alignment with a mold carried by said table, and an inclined position in which said plunger is displaced from said mold, and pneumatically operated means for lowering and raising said plunger when said frame is upright.

17. A glass press comprising a mold table, a plurality of molds carried thereby, an oscillable frame mounted to rock upon a pivot disposed beneath said table, a plunger carrier mounted slidably in said frame, a plunger carried by said plunger carrier, cam-operated means for rocking said frame between an upright position in which said plunger is in vertical alignment with a mold carried by said table, and an inclined position in which said plunger is displaced from said mold, and pneumatically operated means for lowering and raising said plunger when said frame is upright, the said pneumatic plunger operating means comprising a cylinder and connections between said cylinder and said plunger carrier, and the said connections being arranged to produce a toggle effect during the lowering of said plunger, thereby increasing the pressure of said plunger as said plunger descends.

18. Glass-working apparatus comprising a movable mold support, molds carried thereby and brought successively by said support to a feeding and pressing position, a pressing plunger, means for moving said pressing plunger about a horizontal axis out of vertical alignment with its pressing position to enable a charge of glass to be dropped into the mold at said position and for then moving said plunger into vertical alignment with said mold, and means for then producing relative movement between said plunger and the charged mold.

19. A glass press comprising a mold, a plunger arranged to enter said mold to press glass therein, means for oscillating said plunger into and out of alignment with said mold, and means for lowering and raising said plunger comprising a source of mechanical power and connections between said source of power and said plunger, the said connections being arranged to increase the pressure of said plunger as said plunger descends.

20. A glass press comprising a mold, a plunger arranged to enter said mold to press glass therein, means for oscillating said plunger into and out of alignment with said mold, and means for lowering and raising said plunger comprising a source of power and connections between said source of power and said plunger, the said connections being arranged to produce a toggle effect during the lowering of said plunger, thereby increasing the pressure of said plunger as said plunger descends.

Signed at Hartford, Conn., this 13th day of October, 1924.

WILLIAM T. BARKER, Jr.